United States Patent
Schell et al.

(10) Patent No.: US 8,806,873 B2
(45) Date of Patent: Aug. 19, 2014

(54) METHOD FOR OPERATING A GAS TURBINE PLANT

(75) Inventors: Susanne Schell, Baden (CH); Thiemo Meeuwissen, Ennetbaden (CH); Stanka Kokanovic, Berlin (CH); Jürg Käser, Leuzburg (CH); Peter Althaus, Wildegg (CH)

(73) Assignee: Alstom Technology Ltd, Baden (CH)

( * ) Notice: Subject to any disclaimer, the term of this patent is extended or adjusted under 35 U.S.C. 154(b) by 1005 days.

(21) Appl. No.: 12/858,524

(22) Filed: Aug. 18, 2010

(65) Prior Publication Data

US 2011/0056211 A1 Mar. 10, 2011

(30) Foreign Application Priority Data

Aug. 28, 2009 (EP) ..................... 09168896

(51) Int. Cl.
*F02C 3/30* (2006.01)
*F02C 7/00* (2006.01)

(52) U.S. Cl.
USPC .......................................... 60/775; 60/39.55

(58) Field of Classification Search
USPC .......... 60/773, 775, 39.55, 39.57, 241, 39.17, 60/39.53
See application file for complete search history.

(56) References Cited

U.S. PATENT DOCUMENTS

| | | | | |
|---|---|---|---|---|
| 4,214,435 | A * | 7/1980 | Campbell | 60/775 |
| 4,259,837 | A | 4/1981 | Russell et al. | |
| 4,522,024 | A * | 6/1985 | Zaugg | 60/775 |
| 5,307,619 | A * | 5/1994 | McCarty et al. | 60/775 |
| 5,329,758 | A * | 7/1994 | Urbach et al. | 60/775 |
| 5,775,091 | A * | 7/1998 | Bannister et al. | 60/775 |
| 5,906,095 | A * | 5/1999 | Frutschi et al. | 60/775 |
| 6,038,848 | A | 3/2000 | Frutschi | |
| 6,148,602 | A * | 11/2000 | Demetri | 60/775 |
| 7,191,587 | B2 * | 3/2007 | Marin et al. | 60/39.17 |
| 2003/0217553 | A1 | 11/2003 | Gadde et al. | |
| 2004/0088997 | A1 | 5/2004 | Hellat et al. | |

FOREIGN PATENT DOCUMENTS

EP   1990578   11/2008

OTHER PUBLICATIONS

European Search Report for EP Patent App. No. 09168896.0 (Mar. 19, 2010).

* cited by examiner

*Primary Examiner* — Gerald L Sung
(74) *Attorney, Agent, or Firm* — Buchanan Ingersoll & Rooney

(57) ABSTRACT

A gas turbine plant has a compressor (2), a first combustion chamber (6) followed by a high pressure turbine (4), a second combustion chamber (10) and a low pressure turbine (5). In the first combustion chamber (6) a first gaseous fuel (8) is injected and combusted, generating first hot gases (9) that are at least partly expanded in the high pressure turbine (4), and in the second combustion chamber (10) a second fuel (11) is injected in the at least partly expanded hot gases generated in the first combustion chamber (6) and combusted, generating second hot gases (12) that are expanded in the low pressure turbine (5). In the first combustion chamber (6) water is also injected to increase the gas turbine plant power output. In the first combustion chamber (6) a water flow rate is injected compatible with a predetermined flame stability limit. In the second combustion chamber (6) the flame temperature is regulated to burn the non-combusted products generated in the first combustion chamber (6) to bring their amount below a predetermined emission limit, without exceeding a predetermined $NO_x$ emission limit.

12 Claims, 2 Drawing Sheets

METHOD FOR OPERATING A GAS TURBINE PLANT

This application claims priority under 35 U.S.C. §119 to European application no. 09168896.0, filed 28 Aug. 2009, the entirety of which is incorporated by reference herein.

BACKGROUND

1. Field of the Invention

The present invention relates to methods for operating a gas turbine plant.

In particular a gas turbine plant useful for implementing a method in accordance with principles of the present invention has a first and a second combustion chambers, such that hot gases are generated in the first combustion chamber and are expanded in a high pressure turbine; then these hot gases generated in the first combustion chamber are introduced into a second combustion chamber wherein further fuel is injected and combusted to generate second hot gases to be further expanded in a low pressure turbine.

In this respect, the gas turbine plant may include one (or more) sequential combustion gas turbine units, i.e., gas turbines having a compressor, a first combustion chamber, a high pressure turbine, a second combustion chamber, and a low pressure turbine.

Alternatively, the gas turbine plant may include two (or more) superimposed gas turbine units, such that the hot gases discharged from a first gas turbine unit are supplied to a second gas turbine unit.

Thus, in this alternative embodiment the gas turbine plant has a compressor, a first combustion chamber, and a high pressure turbine (defining a first gas turbine unit); the hot gases discharged from the first gas turbine unit are then supplied to a second gas turbine unit having a compressor, a combustion chamber, and a low pressure turbine.

2. Brief Description of the Related Art

As known in the art, a way to increase the power output of a gas turbine plant is to increase the mass flow rate circulating within the turbines.

Typically, the mass flow rate is increased by injecting water into the combustion chambers; usually, water is injected by high fogging injection or fogging and steam injection into the combustion chambers.

Water injection into the combustion chambers greatly influences the combustion conditions, because the flame temperature decreases, causing larger non-combusted product generation (such as CO or UHC) and lower $NO_x$ generation.

In addition, the flame stability is also influenced and, in particular, a reduced flame temperature causes a less stable flame.

Therefore, injecting an excessive amount of water into a combustion chamber, in addition to a too large non-combusted product generation (CO, UHC, which is a negative effect) and a low $NO_x$ generation (which is a positive effect), could cause the stability limit to be reached and also overcome, this leading to very unstable combustion with generation of pulsations that cause mechanical stress and reduced lifetime for the turbines and noisy operation.

Therefore the amount of water that is injected into the combustion chambers during operation must be controlled and must be limited, such that the non-combusted products (CO and UHC) generation is not excessive and pulsations are also limited.

Typically, the amount of water injected into each combustion chamber is regulated on the basis of the non-combusted product generation (such as CO or UHC) and $NO_x$ generation, because these limits are stricter than the flame stability limit.

Clearly this regulation, limiting the amount of water that can be injected into the combustion chambers, limits the power increase that can be achieved via water injection.

SUMMARY

One of numerous aspects of the present invention therefore includes providing a gas turbine plant by which the aforementioned problems of the known art are addressed.

Another aspect of the present invention includes a method with which the power output can be sensibly increased by injecting water, without increasing the non-combusted product generation (CO and UHC) up to unacceptable levels and, in addition, also limiting the stress to which the gas turbine plant components are subjected, such that the timelife of the gas turbine plant is not impaired.

Another aspect of the invention is to provide a method by which also the $NO_x$ generation is limited.

Advantageously, methods embodying principles of the present invention let power augmentation be achieved via water injection without the costs of the hardware for generating and regulating the fog or steam to be injected in the combustion chambers.

BRIEF DESCRIPTION OF THE DRAWINGS

Further characteristics and advantages of the invention will be more apparent from the description of a preferred but non-exclusive embodiment of the method according to the invention, illustrated by way of non-limiting example in the accompanying drawings, in which.

DETAILED DESCRIPTION OF EXEMPLARY EMBODIMENTS

Methods embodying principles of the present invention can be implemented using a gas turbine plant having two (or more) combustion chambers, wherein a second combustion chamber is fed with the hot gases generated in a first combustion chamber.

Figure 1:
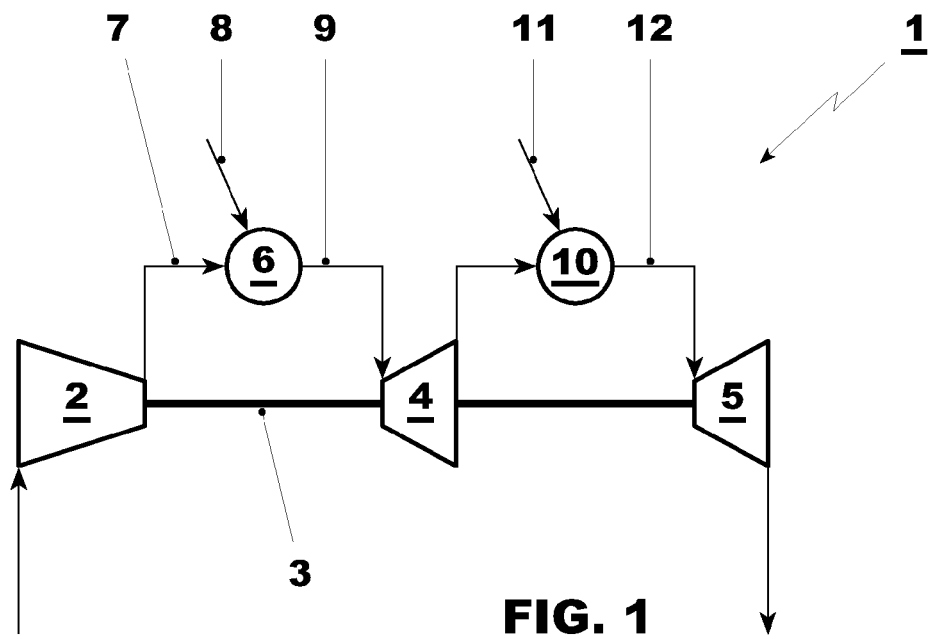
FIG. 1 is a schematic view of a first gas turbine plant that implements a method of the invention.
Figure 2:
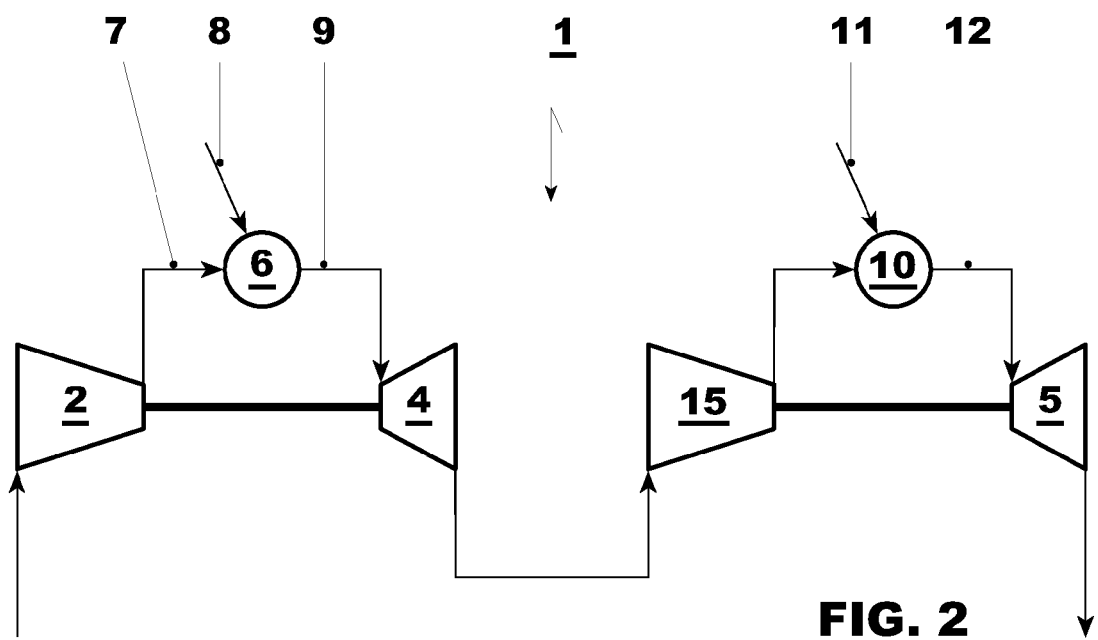
FIG. 2 is a further schematic view of a second gas turbine plant that implements a method of the invention.

In this respect, FIGS. 1 and 2 show two different embodiments of gas turbine plants that are able to implement methods embodying principles of the present invention.

It is anyhow clear that also different gas turbine plants may implement methods as described herein, provided that they have two combustion chambers with the second combustion chamber that is fed with the hot gases generated in the first combustion chamber.

The gas turbine plant 1 of FIG. 1 has a compressor 2 connected via a shaft 3 to a high pressure turbine 4 and low pressure turbine 5.

In addition, a first combustion chamber 6 is provided that is fed with compressed air 7 from the compressor 2; in the combustion chamber 6, a first fuel 8 is injected and is combusted, generating first hot gases 9 that are partly expanded in the high pressure turbine 4.

Then the partly expanded hot gases discharged from the high pressure turbine 4 are supplied to a second combustion chamber 10 wherein a second fuel 11 is fed and combusted, generating second hot gases 12 that are expanded in the low pressure turbine 5.

FIG. 2 shows a different embodiment of a gas turbine plant arranged to implement methods embodying principles of the present invention; in particular in FIG. 2 equal or similar elements to those of FIG. 1 are indicated with the same reference numbers.

The gas turbine plant 1 of FIG. 2 has two gas turbine units each having a compressor, a combustion chamber, and a turbine.

Thus, FIG. 2 shows the compressor 2, the first combustion chamber 6, and the high pressure turbine 4 (first gas turbine unit).

In addition, in FIG. 2, a second compressor 15, the second combustion chamber 10, and the low pressure turbine 5 are also shown (second gas turbine unit).

During operation, the first hot gases 9 (generated in the first combustion chamber 6 combusting the first fuel 8 and partly expanded in the high pressure turbine 4) are supplied into the second combustion chamber 10 (eventually via the second compressor 15).

According to methods embodying principles of the present invention, in the first combustion chamber 6 water is injected to increase the gas turbine plant power output.

In particular, in the first combustion chamber 6, a water flow rate compatible with a prefixed flame stability limit is injected and preferably up to or a maximum water flow rate compatible with a prefixed flame stability limit is injected.

The flame stability limit is defined by an operating condition with the lowest flame temperature with no pulsation generation.

Thus, when operating at the flame stability limit, the flame temperature is low but the combustion is still stable with no pulsation generation; nevertheless a further decrease of the flame temperature would cause unstable combustion and pulsation generation.

Therefore, according to principles of the present invention, the water mass flow rate injected into the combustion chamber 6 is preferably the greatest possible without overcoming the flame stability limit.

This lets the power output be increased without impairing the reliance of the gas turbine.

During operation in these conditions, the amount of non-combusted products (CO and UHC) generated is very high, because the lower the flame temperature, the higher the non-combusted products generation.

At the same time, the amount of $NO_x$ generated is very low, because the lower the flame temperature, the lower the $NO_x$ generation.

After partial expansion in the high pressure turbine 4, the hot gases 9 (that contain a large amount of non-combusted products and a low amount of $NO_x$) are supplied to the second combustion chamber 10 (eventually after being re-compressed in the compressor 15).

In the second combustion chamber 10, the flame temperature is regulated to burn the non-combusted products (such as CO and UHC).

In particular, in the second combustion chamber 10 the flame temperature is regulated, such that the non-combusted products such as CO and UHC produced in a very large quantity in the first combustion chamber 6 are largely combusted and their amount in the hot gases 12 generated in the second combustion chamber 10 is below a prefixed amount (emission limit).

At the same time, even if the $NO_x$ production in the second combustion chamber 10 is large, such that the $NO_x$ quantity contained within the hot gases 12 increases with respect to the $NO_x$ quantity of the hot gases 9, in any case since the $NO_x$ production in the first combustion chamber is very low, the total $NO_x$ quantity in the hot gases 12 is typically low and in any case below a prefixed amount (emission limit).

In addition, since the stability limit is overcome in neither the first combustion chamber 6 nor the second combustion chamber 10, the lifetime of the gas turbine plant is not impaired.

Naturally, if the operating conditions so permit, water injection in the second combustion chamber 10 may also be increased until an emission limit for the $NO_x$ is reached, or even until the stability limit for the second combustion chamber 10 is reached.

Advantageously, the temperature of the second combustion chamber 10 is regulated at a temperature higher than the temperature of the first combustion chamber.

Preferably also the second fuel 11 (i.e., the fuel injected into the second combustion chamber 10) is a gaseous fuel and the flame temperature in the second combustion chamber 10 is regulated by regulating a water flow rate injected thereinto.

In fact, even if there are also other possible ways to regulate the flame temperature in the second combustion chamber 10, water injection is preferred because it lets the flame temperature to be very precisely regulated and, in addition, the mass flow rate circulating within the low pressure turbine 5 to be further increased, thus further increasing the gas turbine plant power output.

During normal operation the gas turbine plant 1 may operate without water injection or with limited water flow rate injection.

Then, when more power is requested, water can be injected into the first and eventually also into the second combustion chambers 6 and 10.

Figure 3:
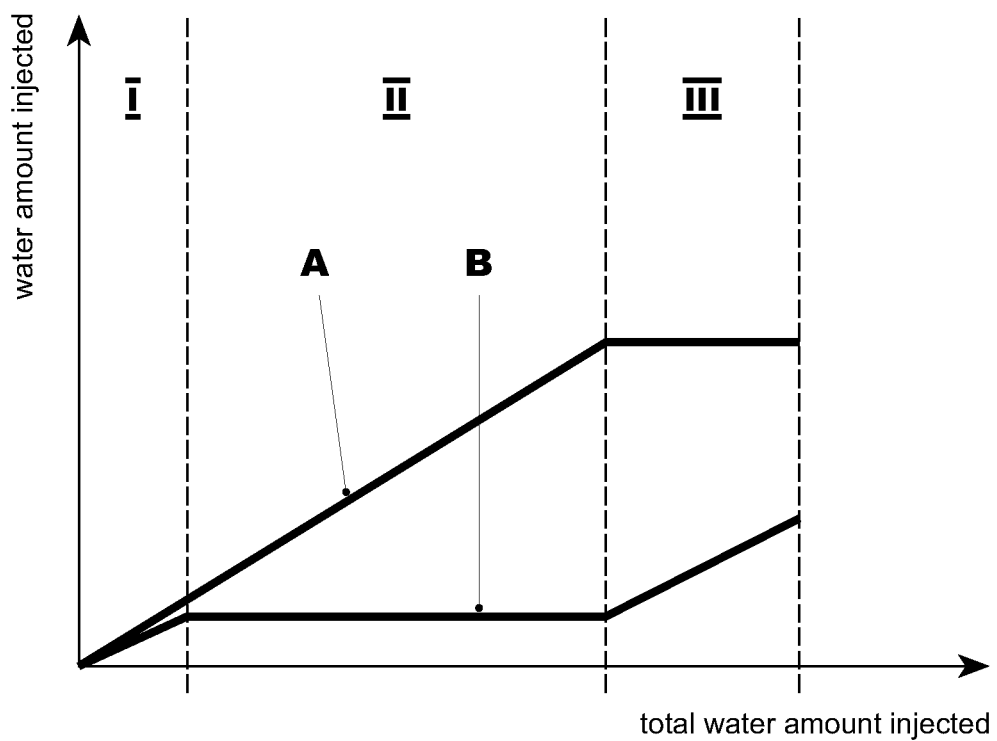
FIG. 3 is a diagram that shows the amount of water injected into each combustion chamber.

For example, as shown in FIG. 3, which shows the relationship between the water amount injected and total water amount injected, respectively in the first combustion chamber (curve A) and the second combustion chamber (curve B), during normal operation no water is injected either in the first and the second combustion chambers 6, 10.

When more power is required, water is injected both in the first and second combustion chambers 6, 10.

In particular, in a first period I water is injected and continuously increased in both the first and second combustion chambers 6, 10.

Then, in a second period II, the water injected in the first combustion chamber 6 is further increased up to the stability limit of the first combustion chamber 6, whereas water injected in the second combustion chamber 10 is kept constant.

In a third period III, when the stability limit for the first combustion chamber 6 has been reached, the amount of water injected in the first combustion chamber 6 is kept constant, whereas the amount of water injected in the second combustion chamber is increased up to a level at which the non-combusted products (CO, UHC) and $NO_x$ emissions are within prefixed limits (emission limits, typically these limits are defined by the law).

Alternatively, if non-combusted products (CO, UHC) and $NO_x$ emissions so permit, the amount of water injected in the second combustion chamber may also be increased until an emission limit for the $NO_x$ is reached or up to the stability limit of the second combustion chamber 10.

Water is injected as a water jet, thus it may be injected via a lance for dual fuel engines (i.e., gaseous and liquid fuel); in this case, as lances are still provided with different ducts for gaseous and liquid fuel, no hardware modifications or very limited hardware modifications are needed within the combustion chambers 6, 10 or the components connected to them; therefore, also, the costs are very low.

Naturally the features described may also be independently provided from one another.

Methods embodying principles of the present invention and conceived in this manner are susceptible to numerous modifications and variants, all falling within the scope of the inventive concept; moreover all details can be replaced by technically equivalent elements.

In practice the materials used and the dimensions can be chosen at will according to requirements and to the state of the art.

Reference Numbers
1 gas turbine plant
2 compressor
3 shaft
4 high pressure turbine
5 low pressure turbine
6 first combustion chamber
7 compressed air
8 first fuel
9 first hot gases
10 second combustion chamber
11 second fuel
12 second hot gases
15 compressor
A water amount injected in the first combustion chamber
B water amount injected in the second combustion chamber
I first operating period
II second operating period
III third operating period While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a gas turbine plant having a compressor, a first combustion chamber followed by a high pressure turbine, a second combustion chamber, and a low pressure turbine, the method comprising:
    defining a prefixed emission limit for the gas turbine plant;
    injecting and combusting a first gaseous fuel in the first combustion chamber, generating first hot gases and non-combusted products above the prefixed emission limit;
    at least partly expanding the first hot gases in the high pressure turbine;
    injecting and combusting a second fuel in the at least partially expanded first hot gases in the second combustion chamber, generating second hot gases;
    expanding the second hot gases in the low pressure turbine;
    injecting water at least in the first combustion chamber to increase the gas turbine plant power output;
    wherein injecting water comprises injecting in the first combustion chamber at a water flow rate such that flame stability in the first combustion chamber does not pass a predetermined flame stability limit; and
    regulating flame temperature in the second combustion chamber to burn non-combusted products generated in the first combustion chamber to bring the amount of non-combusted products below a predetermined emission limit, and without exceeding a predetermined $NO_x$ emission limit.

2. A method as claimed in claim 1, wherein injecting water comprises injecting in the first combustion chamber up to a maximum water flow rate such that the predetermined flame stability limit is not passed, wherein the predetermined flame stability limit is defined by an operating condition with a lowest flame temperature with no pulsation generation.

3. A method as claimed in claim 1, wherein injecting water comprises injecting in the first combustion chamber at a maximum water flow rate such that the predetermined flame stability limit is not passed.

4. A method as claimed in claim 1, wherein regulating comprises regulating the flame temperature in the second combustion chamber at a temperature higher than the temperature of the first combustion chamber.

5. A method as claimed in claim 1, wherein the second fuel is a gaseous fuel.

6. A method as claimed in claim 1, wherein regulating comprises regulating the flame temperature in the second combustion chamber by regulating a water flow rate injected into the second combustion chamber.

7. A method as claimed in claim 1, wherein injecting water comprises increasingly injecting water in the second combustion chamber until an emission limit for the $NO_x$ is reached.

8. A method as claimed in claim 1, wherein injecting comprises increasingly injecting water in the second combustion chamber up to the stability limit of the second combustion chamber.

9. A method as claimed in claim 1, wherein injecting water comprises injecting water in the first and/or second combustion chamber as a water jet.

10. A method, for operating a gas turbine plant haying a compressor, a first combustion chamber followed by a high pressure turbine, a second combustion chamber, and a low pressure turbine, the method comprising:
    injecting and combusting a first gaseous fuel in the first combustion chamber, generating first hot gases;
    at least partly expanding the first hot gases in the high pressure turbine;
    injecting and combusting a second fuel in the at least partially expanded first hot gases in the second combustion chamber, generating second hot gases;
    expanding the second hot gases in the low pressure turbine;
    injecting water at least in the first combustion chamber to increase the gas turbine plant power output, wherein injecting water comprises injecting in the first combustion chamber at a water flow rate such that flame stability in the first combustion chamber does not pass a predetermined flame stability limit;
    regulating flame temperature in the second combustion chamber to burn non-combusted products generated in the first combustion chamber to bring the amount of non-combusted products below a predetermined emission limit, and without exceeding a predetermined $NO_x$ emission limit, and wherein regulating comprises regulating the flame temperature in the second combustion chamber by regulating a water flow rate injected into the second combustion chamber; and wherein regulating the water flow rate comprises:
- in a first period (I), injecting water in both the first and second combustion chambers;
- in a second period (II) after said first period, injecting water in the first combustion chamber at a flow rate up to the stability limit of the first combustion chamber, and in the second combustion chamber at a constant flow rate, and
- in a third period (III) after said first and second periods, when the stability limit for the first combustion chamber has been reached, injecting water at a constant flow rate, and injecting water at an increased flow rate in the second combustion chamber.

11. A method as claimed in claim 10, wherein the second fuel is a gaseous fuel.

12. A method as claimed in claim 10, wherein injecting water comprises injecting water in the first and/or second combustion chamber as a water jet.

\* \* \* \* \*